(12) United States Patent
Lin (10) Patent No.: US 8,117,077 B2
(45) Date of Patent: Feb. 14, 2012

(54) METHOD AND SYSTEM OF ONLINE SHOPPING VIA THIRD PARTY USING BLOG

(76) Inventor: Nankuei Lin, Taipei (TW)

( * ) Notice: Subject to any disclaimer, the term of this patent is extended or adjusted under 35 U.S.C. 154(b) by 394 days.

(21) Appl. No.: 12/409,536

(22) Filed: Mar. 24, 2009

(65) Prior Publication Data

US 2010/0250395 A1 Sep. 30, 2010

(51) Int. Cl.
*G06Q 30/00* (2006.01)
(52) U.S. Cl. ............... 705/26.1; 705/40; 715/738
(58) Field of Classification Search ............ None
See application file for complete search history.

(56) References Cited

U.S. PATENT DOCUMENTS

| | | | |
|---|---|---|---|
| 2005/0027654 A1* | 2/2005 | Adrian | 705/40 |
| 2010/0094729 A1* | 4/2010 | Gray et al. | 705/27 |

\* cited by examiner

*Primary Examiner* — Luna Champagne (57) ABSTRACT

A system of online shopping via a sales agent includes user terminals (1); seller terminals (21); sales agent terminals (22); two web servers (3) wherein one web server (3) comprises a seller blog (31) including item description web pages (3W1), and the other web server (3) comprises a sales agent blog (32) including item web pages (3W2); an online billing platform (4); and bank terminals (5). The user terminals (1), the seller terminals (21), the sales agent terminals (22), the web servers (3), the online billing platform (4), and the bank terminals (5) are connected together via the Internet (6). Methods of online shopping via a third party (e.g., sales agent or OEM) using a blog are also provided.

1 Claim, 4 Drawing Sheets

METHOD AND SYSTEM OF ONLINE SHOPPING VIA THIRD PARTY USING BLOG

BACKGROUND OF THE INVENTION

1. Field of Invention

The invention relates to e-business and more particularly to method and system of online shopping via a third party (e.g., sales agent or original equipment manufacturer (OEM)) using a blog.

2. Description of Related Art

A blog is a type of personal diary posted on the Internet. Most blogs consist of small, plentiful entries. Topics posted on blogs may vary widely.

Conventionally, e-business is not possible using blog. This is because only data like pictures and documents are typically transmitted by a web server. High cost and technological difficulties make e-business using blog almost infeasible.

Currently, there are many websites providing online shopping. Typically, an item and a brief description thereof are shown on a web page. Hence, a would-be buyer may not know details of a desired item by simply viewing the web page. This may greatly decrease buying desire of many would-be buyers. A lot of restrictions are also applied on web pages provided by the online auction and shopping websites. This may further frustrate many would-be sellers.

Thus, it is desirable to provide a novel method and system of online shopping via a third party using a blog in order to fully utilize the features of blog.

SUMMARY OF THE INVENTION

It is therefore one object of the invention to provide a system of online shopping via a third party using a blog.

It is another object of the invention to provide a method of online shopping via a sales agent using a blog.

It is a further object of the invention to provide a method of online shopping via an OEM using a blog.

The above and other objects, features and advantages of the invention will become apparent from the following detailed description taken with the accompanying drawings.

DETAILED DESCRIPTION OF THE INVENTION

Figure 1:
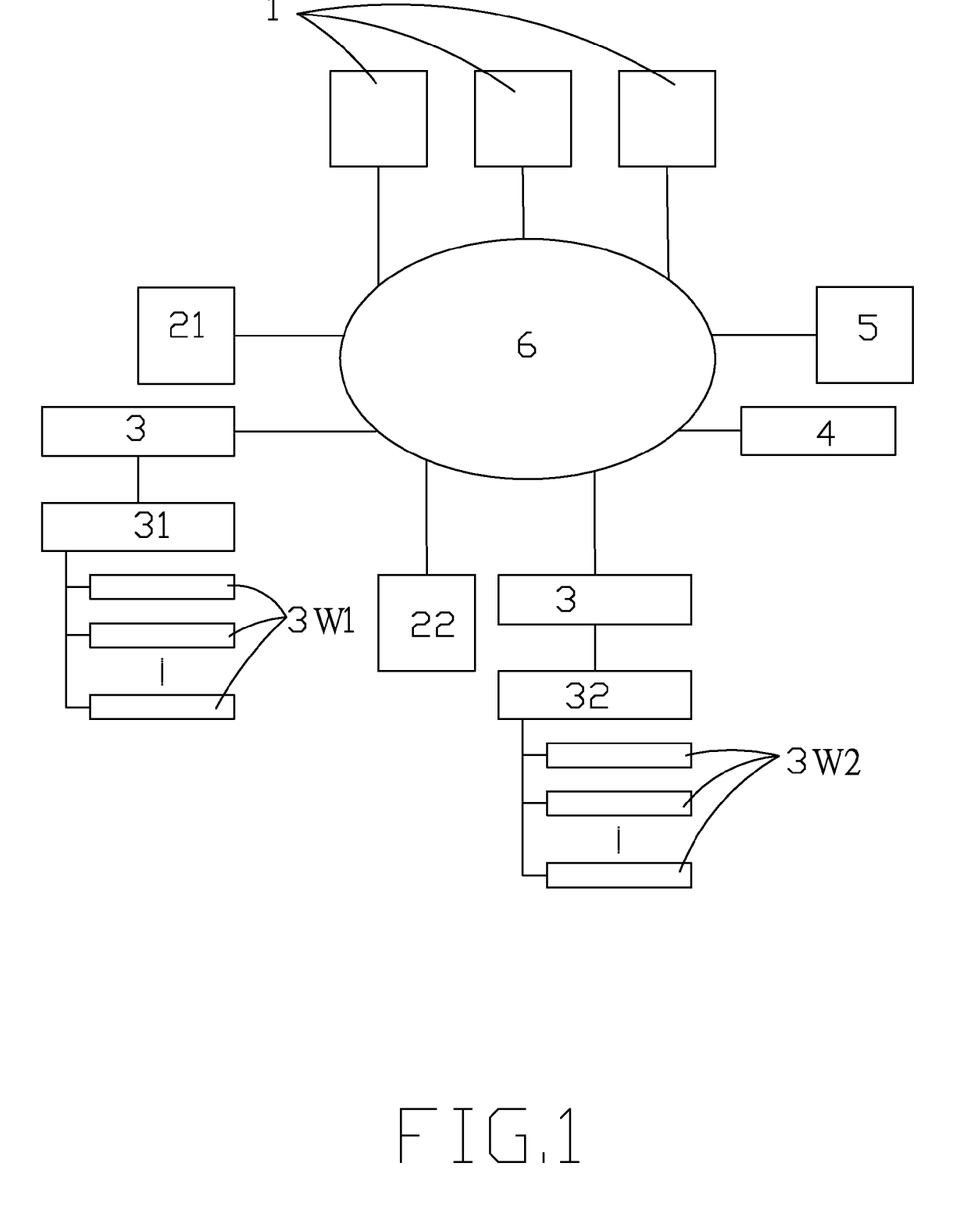
FIG. 1 is a block diagram schematically depicting a first preferred embodiment of system of online shopping via a sales agent using blog according to the invention.
Figure 2:
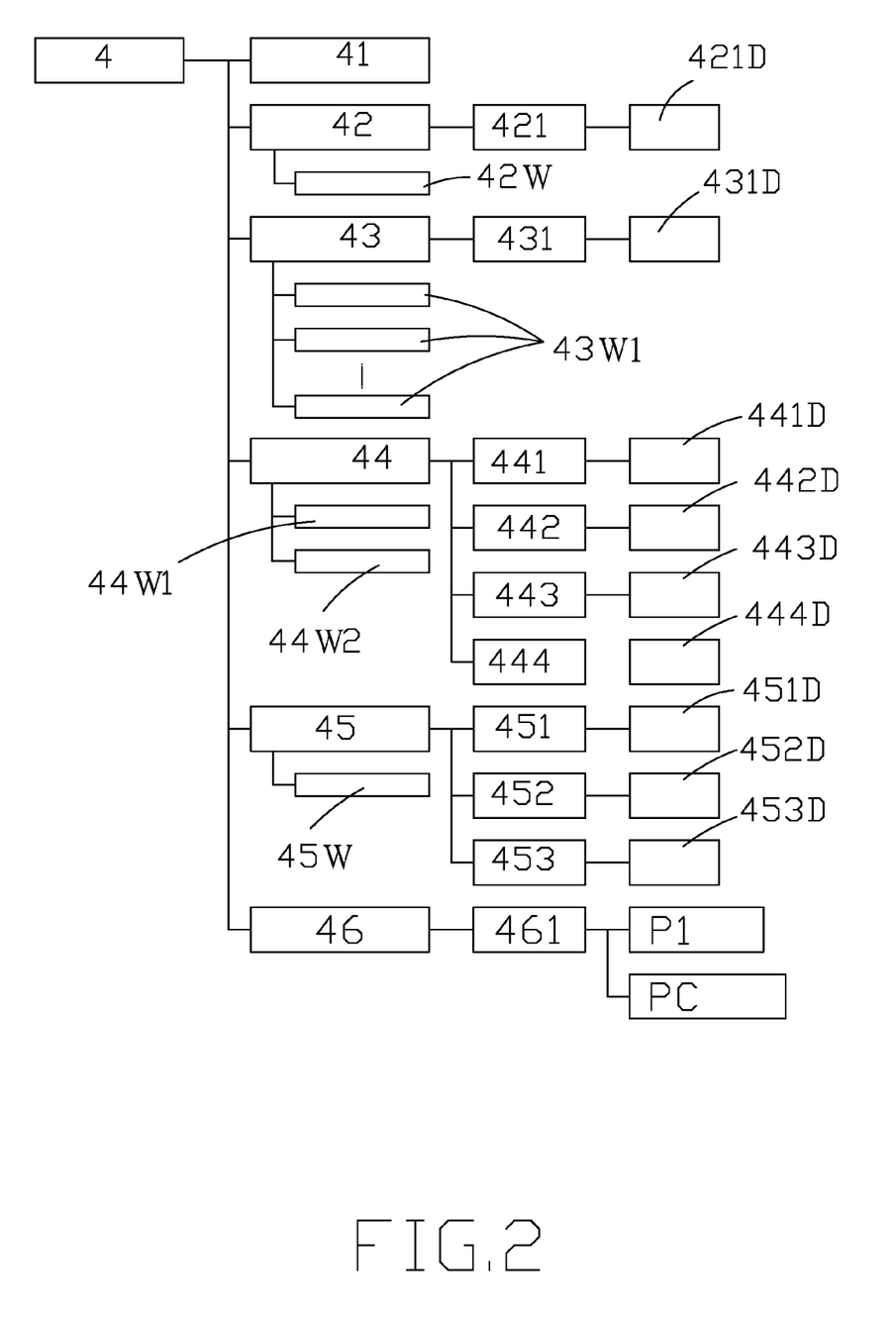
FIG. 2 is a block diagram schematically depicting the online billing platform of FIG. 1.

Referring to FIGS. 1 and 2, a system of online shopping via a sales agent using blog in accordance with a first preferred embodiment of the invention is shown. The system comprises a plurality of user terminals 1, a plurality of seller terminals (only one is shown) 21, a plurality of sales agent terminals (only one is shown) 22, a plurality of web servers 3, an online billing platform 4, and a plurality of bank terminals (only one is shown) 5 all being connected together via the Internet 6.

One web server 3 comprises a seller blog 31. The other web server 3 comprises a sales agent blog 32. The online billing platform 4 comprises a platform server 41, a login server 42, an item server 43, a billing server 44, an e-mail server 45, and a function server 46, all being connected together by wires.

The login server 42 comprises a member database 421. The item server 43 comprises a merchandise database 431. The billing server 44 comprises a purchase order database 441, a bank database 442, a shipment database 443, and a request for payment database 444. The e-mail server 45 comprises an e-mail database 451, a client database 452, and an advertisement database 453. The function server 46 comprises a program database 461 having a sales agent tab program P1. The sales agent tab program P1 comprises a guide tab and a payment tab.

The method of online shopping via sales agent using blog in accordance with a first preferred embodiment of the invention comprises the following steps.

A seller may use a seller terminal 21 to access the seller blog 31 over the Internet 6. The seller then creates a plurality of item description web pages 3W1 in the seller blog 31. A number of pictures and accompanying description of items being sold are posted on each of the item description web pages 3W1. The seller then uses the seller terminal 21 to access the platform server 41 via the Internet 6. Next, the seller gains access to a member web page 42W of the login server 42 and types personal data for membership application.

After becoming a member, a seller may gain access to the platform server 41 via the Internet 6. Next, it is connected to the login server 42. Next, user name and password are typed for identification. After being identified, the seller may gain access to the program database 461. Next, program codes of the sales agent tab program P1 are copied to the seller terminal 21 based on his or her rights and a desired purchase mode. Next, the seller may use the seller terminal 21 to link to a seller blog 31. After successfully linking, the seller may copy program codes of the sales agent tab program P1 to the seller blog 31. Thus, program codes of the sales agent tab program P1 may be installed in the item description web page 3W1. Also, the guide tab of the sales agent tab program P1 is installed in the item description web page 3W1.

A seller may click the guide tab of the item description web page 3W1 of the seller blog 31 to link the item description web page 3W1 of the seller blog 31 to the platform server 41 of the online billing platform 4 via the Internet 6. Next, it is linked to the login server 42. Next, user name and password are typed for identification. After being identified, the seller is linked to the item server 43. Next, a number of pictures and accompanying description of items being sold on the item description web page 3W1 of the seller blog 31 are downloaded to the merchandise database 431 of the item server 43. Next, a merchandise file 431D is created in the merchandise database 431. Tab program codes PC are created in the program database 461. Next, the seller may obtain the tab program codes PC by linking to the program database 461. Next, the seller may use the seller terminal 21 to link to the seller blog 31 and copy the tab program codes PC to the seller blog 31. The payment tab is contained in the item description web page 3W1. A buyer may click the payment tab to start a payment procedure.

A plurality of merchandise sale web pages 43W1 are created by the merchandise file 431D. Also, the payment tab and a link tab are contained in the merchandise sale web page 43W1. The buyer may click the payment tab to start a payment procedure. A would-be buyer may click the link tab to link the platform server 41 of the online billing platform 4 to the item description web page 3W1 of the seller blog 31 in order to view details of pictures and accompanying description of items being sold.

The would-be buyer may use a user terminal 1 to link to a seller blog 31 so as to view the pictures and accompanying description of items being sold on the item description web page 3W1 of the seller blog 31. For buying one or more desired items, the would-be buyer may click the payment tab on the item description web page 3W1 to start a payment procedure.

Alternatively, the would-be buyer may use a user terminal 1 to link to a platform server 41 of the online billing platform 4 and in turn link to an item server 43 in order to view pictures and accompanying description of items being sold on the merchandise sale web page 43W1 of the item server 43. For buying one or more items posted on the merchandise sale web page 43W1, the would-be buyer may click the payment tab on the merchandise sale web page 43W1 to start a payment procedure.

Still alternatively, the would-be buyer may click the link tab on the merchandise sale web page 43W1 to link the platform server 41 to the item description web page 3W1 in order to view pictures and accompanying description of items being sold thereon.

The method of online shopping via sales agent using blog further comprises the following steps:

The sales agent may use a sales agent terminal 22 to link to a sales agent blog 32. Next, the sales agent is required to create a plurality of item web pages 3W2 in the sales agent blog 32 if the sales agent wants to sell items posted on the item description web pages 3W1. A number of pictures and accompanying description of items being sold on the item description web page 3W1 are further posted on the item web page 3W2. The sales agent may use a sales agent terminal 22 to link to a platform server 41 of the online billing platform 4. Next, the sales agent may type personal data for membership application.

After becoming a member, a sales agent may gain access to the platform server 41 via the Internet 6. Next, it is connected to the login server 42. Next, user name and password are typed for identification. After being identified, the sales agent may gain access to the program database 461. Next, program codes of the sales agent tab program P1 are copied to the sales agent terminal 22 based on his or her rights and a desired purchase mode. Next, the sales agent may use the sales agent terminal 22 to link to a sales agent blog 32. After successfully linking, the sales agent may copy program codes of the sales agent tab program P1 to the sales agent blog 32. Thus, program codes of the sales agent tab program P1 may be installed in the item web page 3W2. Also, the guide tab of the sales agent tab program P1 is installed in the item web page 32.

Thereafter, a sales agent may use a sales agent terminal 22 to link to a platform server 41 of the online billing platform 4 and in turn link to a login server 42. After successfully linking, the sales agent may type his or her user name and password for identification. After being identified, the sales agent may obtain the tab program codes PC by linking to the program database 461. Next, the sales agent may use the sales agent terminal 22 to link to the sales agent blog 32 and copy the tab program codes PC to the sales agent blog 32. The payment tab is contained in the item web page 3W2. A would-be buyer may click the payment tab to start a payment procedure.

The would-be buyer may use a user terminal 1 to link to a sales agent blog 32 so as to view the pictures and accompanying description of items being sold on the item web page 3W2. For buying one or more desired items, the would-be buyer may click the payment tab on the item web page 3W2 to start a payment procedure.

The method of online shopping via sales agent using blog further comprises the following steps:

The seller may use a seller terminal 21 to link to a platform server 41 of the online billing platform 4 and in turn link to a login server 42. Next, user name and password are typed for identification. After being identified, the seller may link to an e-mail server 45 to send a client file to a client database 452 of the e-mail server 45. And in turn, a corresponding client record file 452D is created. The e-mail server 45 of the online billing platform 4 may create an advertisements issuing web page 45W based on the client record file 452D and the merchandise file 431D.

The seller may use a seller terminal 21 to link to a platform server 41 of the online billing platform 4 and in turn link to a login server 42. Next, user name and password are typed for identification. After being identified, the seller may link to an advertisements issuing web page 45W of an e-mail server 45. Also, the seller is required to input a client list and information about merchandise being sold on the advertisements issuing web page 45W required for advertisement purposes. An issued advertisements file 453D is created in the advertisement database 453 of the e-mail server 45 based on the client list and information about merchandise being sold. The e-mail server 45 then sends the issued advertisements file 453D to a would-be buyer by e-mail. Note that the payment tab contained in the e-mail has been enabled. Hence, the would-be buyer may click the payment tab to start a payment procedure.

A payment procedure involves the following steps: A would-be buyer may click the payment tab to link to a platform server 41 of the online billing platform 4 and in turn link to a login server 42. Next, user name and password are typed for identification. After being identified, the buyer may link to a payment web page 44W1 of a billing server 44. Also, the buyer is required to input payment data on the payment web page 44W1. A purchase order file with order number 441D is created in the purchase order database 441 of the billing server 44 based on the payment data.

The platform server 41 of the online billing platform 4 then links to a bank terminal 5. The billing server 44 then verifies information (e.g., credit card information) provided in the purchase order file with order number 441D with a corresponding credit card issuing bank. After being verified, a transaction particulars file with order number 442D is created in a bank database 442 of the billing server 44 based on an authorization from the bank. Also, a shipment file with order number 443D is created in the shipment database 443 of the billing server 44.

The e-mail server 45 then sends the purchase order file with order number 441D to the buyer by e-mail. Also, the e-mail server 45 then sends an e-mail to inform the seller to prepare the ordered item for shipment based on the shipment file with order number 443D.

The method of online shopping via sales agent using blog further comprises the following steps:

After successfully shipping the goods, the sales agent may use a sales agent terminal 22 to link to a platform server 41 of the online billing platform 4 and in turn link to a login server 42. Next, user name and password are typed for identification. After being identified, the sales agent may link to a request for payment web page 44W2 of the billing server 44. Also, the sales agent is required to input request for payment data on the request for payment web page 44W2. A debit note file with order number 444D is created in the request for payment database 444 of the billing server 44 based on the request for payment data.

After being verified by a manager of the online billing platform 4, an invoice is prepared based on the debit note file with order number 444D. The invoice is finally issued to the buyer for request for payment.

Figure 3:
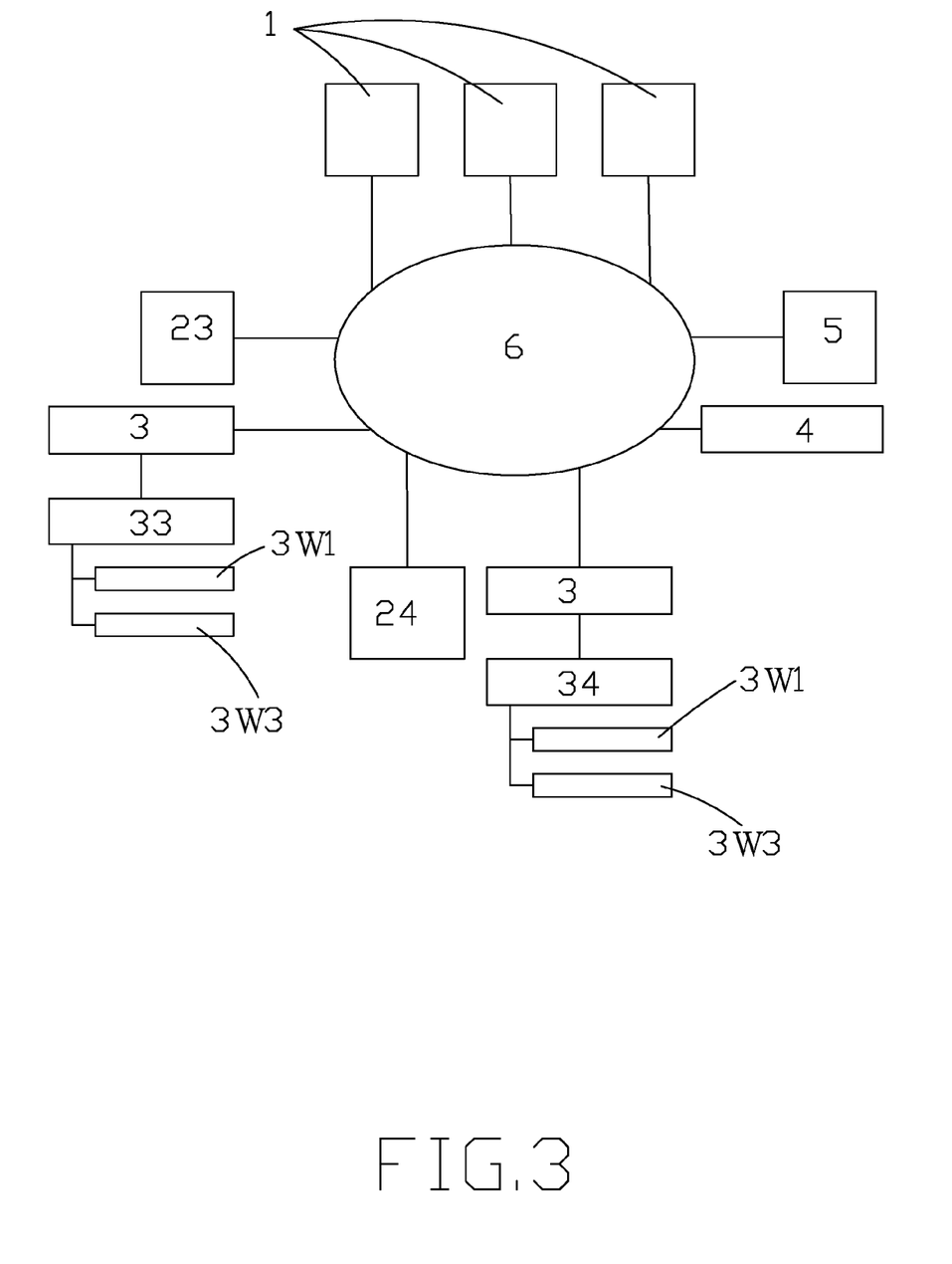
FIG. 3 is a block diagram schematically depicting a second preferred embodiment of system of online shopping via an OEM using blog according to the invention.
Figure 4:
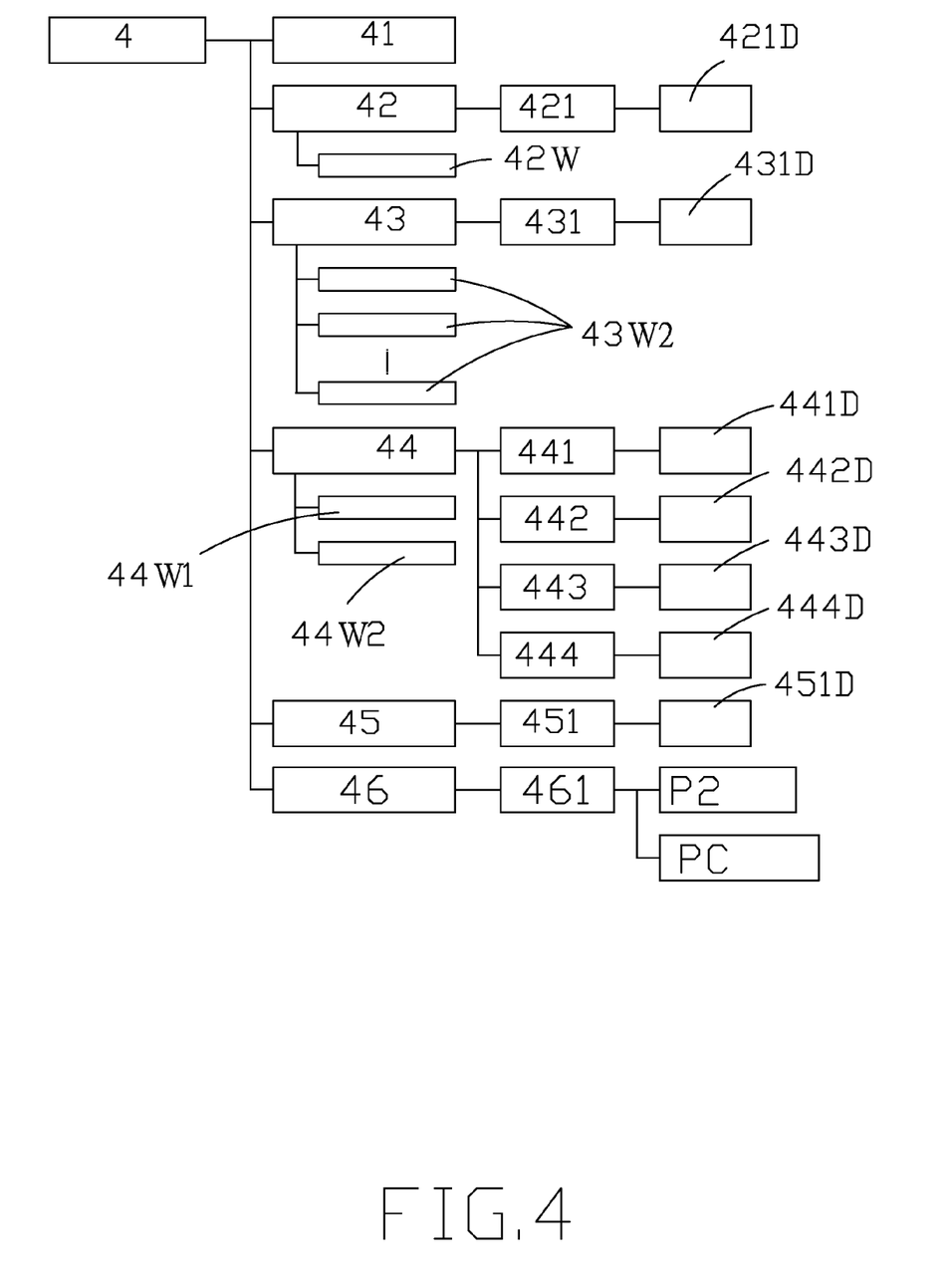
FIG. 4 is a block diagram schematically depicting the online billing platform of FIG. 3.

Referring to FIGS. 3 and 4, a system of online shopping via an original equipment manufacturer (OEM) using blog in accordance with a second preferred embodiment of the invention is shown. The system comprises a plurality of user terminals 1, a seller terminal 23, a reseller terminal 24, a plurality of web servers (only one is shown) 3, an online billing platform 4, and a plurality of bank terminals (only one is shown) 5 all being connected together via the Internet 6.

One web server 3 comprises a seller blog 33. The other web server 3 comprises a reseller blog 34. The online billing platform 4 comprises a platform server 41, a login server 42, an item server 43, a billing server 44, an e-mail server 45, and a function server 46. all being connected together by wires.

The login server 42 comprises a member database 421. The item server 43 comprises a merchandise database 431. The billing server 44 comprises a purchase order database 441, a bank database 442, a shipment database 443, and a request for payment database 444. The e-mail server 45 comprises an e-mail database 451. The function server 46 comprises a program database 461 having an original equipment manufacturer (OEM) tab program P2. The OEM tab program P2 comprises a guide tab and a purchase confirmation tab.

The method of online shopping via OEM using blog in accordance with a first preferred embodiment of the invention comprises the following steps.

A seller may use a seller terminal 23 to access the seller blog 33 over the Internet 6. The seller then creates an item description web page 3W1 in the seller blog 33. A number of pictures and accompanying description of items being sold are posted on the item description web page 3W1 of the seller blog 33.

Further, a reseller may use a reseller terminal 24 to access the reseller blog 34 over the Internet 6. The reseller then creates an item description web page 3W1 in the reseller blog 34. A number of pictures and accompanying description of items being sold are posted on the item description web page 3W1 of the reseller blog 34.

A manager of the online billing platform 4 may design or develop at least one OEM product based on a combination of at least one of the items posted on the item description web page 3W1 of the seller blog 33 and at least one of the items posted on the item description web page 3W1 of the reseller blog 34. Further, the manager of the online billing platform 4 may create an OEM merchandise file 431D in the merchandise database 431. Furthermore, tab program codes PC are created in the program database 461. A plurality of OEM merchandise sale web pages 43W2 are created by the OEM merchandise file 431D. A payment tab, a first link tab, and a second link tab are contained in the OEM merchandise sale web page 43W2. A buyer may click the payment tab to start a payment procedure.

A would-be buyer may click the first link tab to link the platform server 41 of the online billing platform 4 to the item description web page 3W1 of the seller blog 33 in order to view details of pictures and accompanying description of items being sold. Moreover, the would-be buyer may click the second link tab to link the platform server 41 of the online billing platform 4 to the item description web page 3W1 of the reseller blog 34 in order to view details of pictures and accompanying description of items being sold.

The seller then uses the seller terminal 23 to link to a seller blog 33 after viewing items being sold on the OEM merchandise sale web pages 43W2. After successfully linking, an OEM merchandise web page 3W3 is created in the seller blog 33. A number of pictures and accompanying description of items being sold are posted on the OEM merchandise web page 3W3 of the seller blog 33. Next, the seller may use a seller terminal 23 to link to the platform server 41 of the online billing platform 4 and in turn link to a member web page 42W of the login server 42. Finally, the seller may type personal data for membership application.

After becoming a member, a seller may gain access to the platform server 41 via the Internet 6. Next, it is connected to the login server 42. Next, user name and password are typed for identification. After being identified, the seller may gain access to the program database 461. Next, program codes of the OEM tab program P2 are copied to the seller terminal 23 based on his or her rights and a desired purchase mode. Next, the seller may use the seller terminal 23 to link to a seller blog 33. After successfully linking, the seller may copy program codes of the OEM tab program P2 to the seller blog 33. Thus, program codes of the OEM tab program P2 may be installed in the OEM merchandise web page 3W3 of the seller blog 33. Also, the guide tab of the OEM tab program P2 is installed in the OEM merchandise web page 3W3 of the seller blog 33.

Thereafter, the seller may use the seller terminal 23 to link to a seller blog 33. After successfully linking, the seller may copy program codes of the OEM tab program P2 to the seller blog 33. Thus, program codes of the OEM tab program P2 may be installed in the OEM merchandise web page 3W3 of the seller blog 33. Also, the guide tab of the OEM tab program P2 is installed in the OEM merchandise web page 3W3 of the seller blog 33.

Thereafter, the seller may use a seller terminal 23 to link to the platform server 41 of the online billing platform 4 and in turn link to the login server 42. Next, user name and password are typed for identification. After being identified, the seller may obtain the tab program codes PC by linking to the program database 461. Next, the seller may use the seller terminal 23 to link to the seller blog 33 and copy the tab program codes PC to the seller blog 33. The purchase confirmation tab is contained in the OEM merchandise web page 3W3 of the seller blog 33. A buyer may click the purchase confirmation tab to start a payment procedure. Thereafter, the OEM merchandise web page 3W3 of the seller blog 33 may be linked to the platform server 41 and in turn linked to the OEM merchandise sale web pages 43W2 of the item server 43.

A would-be buyer may use a user terminal 1 to link to a seller blog 33 so as to view the pictures and accompanying description of items being sold on the OEM merchandise web page 3W3 of the seller blog 33. For buying one or more desired items, the would-be buyer may click the purchase confirmation tab on the OEM merchandise web page 3W3 of the seller blog 33. Thereafter, the OEM merchandise web page 3W3 of the seller blog 33 is linked to the platform server 41 of the online billing platform 4 and in turn is linked to the OEM merchandise sale web pages 43W2 of the item server 43. The would-be buyer may choose one or more OEM items posted on the OEM merchandise sale web pages 43W2 of the item server 43. Next, the buyer may click the payment tab on the OEM merchandise sale web pages 43W2 of the item server 43 to start a payment procedure.

Alternatively, a would-be buyer may use a user terminal 1 to link to the platform server 41 of the online billing platform 4 and in turn link to the item server 43 so as to view items posted on the OEM merchandise sale web pages 43W2 of the item server 43. For buying one or more desired OEM items, the would-be buyer may choose one or more OEM items posted on the OEM merchandise sale web pages 43W2 of the item server 43. Next, the buyer may click the payment tab on the OEM merchandise sale web pages 43W2 of the item server 43 to start a payment procedure.

Still alternatively, a would-be buyer may click the first link tab of the OEM merchandise sale web pages 43W2 of the item server 43 to link the platform server 41 of the online billing platform 4 to the item description web page 3W1 of the seller blog 33 in order to view details of pictures and accompanying description of items being sold. Moreover, the would-be buyer may click the second link tab of the OEM merchandise sale web pages 43W2 of the item server 43 to link the platform server 41 of the online billing platform 4 to the item description web page 3W1 of the reseller blog 34 in order to view details of pictures and accompanying description of items being sold.

The method of online shopping via OEM using blog further comprises the following steps:

The reseller may use a reseller terminal 24 to link to a reseller blog 34 after viewing items being sold on the OEM merchandise sale web pages 43W2. After successfully linking, an OEM merchandise web page 3W3 is created in the reseller blog 34. A number of pictures and accompanying description of items being sold are posted on the OEM merchandise web page 3W3 of the reseller blog 34. Next, the reseller may use the reseller terminal 24 to link to the platform server 41 of the online billing platform 4 and in turn link to a member web page 42W of the login server 42. Finally, the reseller may type personal data for membership application.

After becoming a member, a reseller may use a reseller terminal 24 to link to the platform server 41 via the Internet 6. Next, it is connected to the login server 42. Next, user name and password are typed for identification. After being identified, the reseller may gain access to the program database 461. Next, program codes of the OEM tab program P2 are copied to the reseller terminal 24 based on his or her rights and a desired purchase mode. Next, the reseller may use the reseller terminal 24 to link to a reseller blog 34. After successfully linking, the reseller may copy program codes of the OEM tab program P2 to the reseller blog 34. Thus, program codes of the OEM tab program P2 may be installed in the OEM merchandise web page 3W3 of the reseller blog 34. Also, the guide tab of the OEM tab program P2 is installed the OEM merchandise web page 3W3 of the reseller blog 34.

Thereafter, a reseller may use a reseller terminal 24 to link to a platform server 41 of the online billing platform 4 and in turn link to a login server 42. After successfully linking, the reseller may type his or her user name and password for identification. After being identified, the reseller may obtain the tab program codes PC by linking to the program database 461. Next, the reseller may use the reseller terminal 24 to link to the reseller blog 34 and copy the tab program codes PC to the reseller blog 34. The purchase confirmation tab is contained in the OEM merchandise web page 3W3 of the reseller blog 34. A would-be buyer may click the purchase confirmation tab to start a payment procedure. Thereafter, the OEM merchandise web page 3W3 of the reseller blog 34 may be linked to the platform server 41 and in turn linked to the OEM merchandise sale web pages 43W2 of the item server 43.

The would-be buyer may use a user terminal 1 to link to a reseller blog 34 so as to view the pictures and accompanying description of items being sold on the OEM merchandise web page 3W3 of the reseller blog 34. For buying one or more desired items, the would-be buyer may click the purchase confirmation tab on the OEM merchandise web page 3W3 of the reseller blog 34. Thereafter, the OEM merchandise web page 3W3 of the seller blog 33 may be linked to the platform server 41 and in turn linked to the OEM merchandise sale web pages 43W2 of the item server 43. For buying, the would-be buyer may choose one or more OEM items posted on the OEM merchandise sale web pages 43W2 of the item server 43. Finally, the buyer may click the payment tab on the OEM merchandise sale web pages 43W2 of the item server 43 to start a payment procedure.

A payment procedure involves the following steps: A would-be buyer may click the purchase confirmation tab to link to a platform server 41 of the online billing platform 4 and in turn link to a login server 42. Next, user name and password are typed for identification. After being identified, the buyer may link to a payment web page 44W1 of a billing server 44. Also, the buyer is required to input payment data on the payment web page 44W1. A purchase order file with order number 441D is created in the purchase order database 441 of the billing server 44 based on the payment data.

The platform server 41 of the online billing platform 4 then links to a bank terminal 5. The billing server 44 then verifies information (e.g., credit card information) provided in the purchase order file with order number 441D with a corresponding credit card issuing bank. After being verified, a transaction particulars file with order number 442D is created in a bank database 442 of the billing server 44 based on an authorization from the bank. Also, a shipment file with order number 443D is created in the shipment database 443 of the billing server 44.

The e-mail server 45 then sends the purchase order file with order number 441D to the buyer by e-mail. Also, the e-mail server 45 then sends an e-mail to inform the seller to prepare the ordered item for shipping to the reseller based on the shipment file with order number 443D. Further, the e-mail server 45 may send an e-mail to inform the reseller to assemble or manufacture an ordered item after receiving the OEM item from the seller based on the shipment file with order number 443D. Furthermore, the reseller will ship the final product to the buyer based on the shipment file with order number 443D.

The method of online shopping via OEM using blog further comprises the following steps:

After successfully shipping the ordered item from the seller to the reseller, the seller may use a seller terminal 23 to link to a platform server 41 of the online billing platform 4 and in turn link to a login server 42. Next, user name and password are typed for identification. After being identified, the seller may link to a request for payment web page 44W2 of the billing server 44. Also, the seller is required to input request for payment data on the request for payment web page 44W2. A debit note file with order number 444D is created in the request for payment database 444 of the billing server 44 based on the request for payment data.

After receiving the ordered item from the seller, assembling or manufacturing the ordered OEM item and successfully shipping the ordered OEM item from the reseller to the buyer, the reseller may use a reseller terminal 24 to link to a platform server 41 of the online billing platform 4 and in turn link to a login server 42. Next, user name and password are typed for identification. After being identified, the reseller may link to a request for payment web page 44W2 of the billing server 44. Also, the reseller is required to input request for payment data on the request for payment web page 44W2. A debit note file with order number 444D is created in the request for payment database 444 of the billing server 44 based on the request for payment data.

After being verified by a manager of the online billing platform 4, an invoice is prepared based on the debit note file with order number 444D. The invoice is finally issued to the buyer for request for payment.

While the invention herein disclosed has been described by means of specific embodiments, numerous modifications and variations could be made thereto by those skilled in the art without departing from the scope and spirit of the invention set forth in the claims.

What is claimed is:

1. A method of online shopping comprising the steps of:
at a seller:
using a seller terminal (21) to access a seller blog (31) over the Internet (6);
creating a plurality of item description web pages (3W1) in the seller blog (31) wherein at least one picture and accompanying description of at least one item being sold are posted on each of the item description web pages (3W1);
using the seller terminal (21) to access a platform server (41) of an online billing platform (4) via the Internet (6);
gaining access to a member web page (42W) of a login server (42) of the online billing platform (4);
applying for membership;
gaining access to the platform server (41);
linking to the login server (42);
logging in for gaining access to a program database (461);
copying program codes of a sales agent tab program (P1) to the seller terminal (21);
using the seller terminal (21) to link to the seller blog (31);
copying the program codes of the sales agent tab program (P1) to the seller blog (31);
installing a payment tab, a guide tab, and the program codes of the sales agent tab program (P1) in each of the item description web pages (3W1);
clicking the guide tab of the item description web page (3W1) for linking to the platform server (41);
linking to the login server (42);
logging in for linking the seller to an item server (43) of the online billing platform (4); downloading the at least one picture and accompanying description of the at least one item being sold on the item description web page (3W1) to a merchandise database (431) of the item server (43);
creating a merchandise file (431D) in the merchandise database (431);
creating tab program codes (PC) in the program database (461);
obtaining the tab program codes (PC) by linking to the program database (461);
using the seller terminal (21) to link to the seller blog (31) and copy the tab program codes (PC) to the seller blog (31); and
creating a plurality of merchandise sale web pages (43W1) having a payment tab and a link tab by the merchandise file (431D);
at a buyer:
clicking the link tab of the merchandise sale web page (43W1) to link the platform server (41) to the item description web page (3W1) for viewing the at least one picture and accompanying description of the at least one item being sold on the item description web page (3W1);
using a user terminal (1) to link to a seller blog (31) for viewing the at least one picture and accompanying description of the at least one item being sold on the item description web page (3W1); and
clicking the payment tab on the item description web page (3W1) to start a payment procedure;
at a sales agent:
using a sales agent terminal (22) to link to a sales agent blog (32);
creating a plurality of item web pages (3W2) in the sales agent blog (32) for selling the at least one item posted on the item description web page (3W1) with the at least one picture and accompanying description of the at least one item being sold on the item description web page (3W1) are further posted on the item web page (3W2);
using the sales agent terminal (22) to link to a platform server (41);
applying for membership;
gaining access to the platform server (41);
linking to the login server (42);
logging in for gaining access to the program database (461);
copying the program codes of the sales agent tab program (P1) to the sales agent terminal (22);
using the sales agent terminal (22) to link to the sales agent blog (32);
copying the program codes of the sales agent tab program (P1) to the sales agent blog (32);
installing the guide tab, the payment tab, and the program codes of the sales agent tab program (P1) in the item web page (3W2);
using the sales agent terminal (22) to link to the platform server (41) and further to the login server (42);
logging in for obtaining the tab program codes (PC) by linking to the program database (461); and
using the sales agent terminal (22) to link to the sales agent blog (32) and copy the tab program codes (PC) to the sales agent blog (32);
at the buyer:
using the user terminal (1) to link to the sales agent blog (32) for viewing the at least one picture and accompanying description of the at least one item being sold on the item web page (3W2);
at the seller:
using the seller terminal (21) to link to the platform server (41) and the login server (42);
logging in to link to an e-mail server (45) of the online billing platform (4);
sending a client file to a client database (452) of the e-mail server (45);
creating a client record file (452D) in the client database (452);
creating an advertisements issuing web page (45W) in the e-mail server (45) of the online billing platform (4) based on the client record file (452D) and the merchandise file (431D);
using the seller terminal (21) to link to the platform server (41) and the login server (42);
logging in for linking to the advertisements issuing web page (45W);
inputting a client list and information about merchandise being sold on the advertisements issuing web page (45W);
creating an issued advertisements file (453D) in an advertisement database (453) of the e-mail server (45) based on the client list and the information about merchandise being sold; and
enabling the e-mail server (45) to send an e-mail including the payment tab and the issued advertisements file (453D) to the buyer;
at the buyer:

buying an item being sold on the item web page (3W2) by clicking the payment tab of the item web page (3W2) which is in turn linked to the platform server (41) and the login server (42);

logging in for linking to a payment web page (44W1) of a billing server (44) of the online billing platform (4);

inputting payment data on the payment web page (44W1); and creating a purchase order file with order number (441D) in a purchase order database (441) of the billing server (44) based on the payment data;

linking the platform server (41) to a bank terminal (5);

enabling the billing server (44) to verify credit card information provided in the purchase order file with order number (441D) with a credit card issuing bank;

creating a transaction particulars file with order number (442D) in a bank database (442) of the billing server (44) based on an authorization from the credit card issuing bank;

creating a shipment file with order number (443D) in a shipment database (443) of the billing server (44);

enabling the e-mail server (45) to send an e-mail including the purchase order file with order number (441D) to the buyer; and enabling the e-mail server (45) to send an e-mail to the seller to prepare the bought item and ship same based on the shipment file with order number (443D);

at the sales agent:

after the shipment, using the sales agent terminal (22) to link to the platform server (41) and the login server (42);

logging in for linking to a request for payment web page (44W2) of the billing server (44);

inputting request for payment data on the request for payment web page (44W2); and creating a debit note file with order number (444D) in a request for payment database (444) of the billing server (44) based on the request for payment data; and after being verified by a manager of the online billing platform (4), preparing an invoice and sending same to the buyer for request for payment.

\* \* \* \* \*